United States Patent

[11] 3,552,547

[72] Inventors Gerald A. Fasse;
Eugene A. Mychalowych, Warren, Mich.
[21] Appl. No. 717,305
[22] Filed Mar. 29, 1968
[45] Patented Jan. 5, 1971
[73] Assignee Booth Newspapers, Inc.
Detroit, Mich.
a corporation of Michigan

[54] AUTOMATIC MOLD DISC CONTROL SYSTEM FOR A LINECASTING MACHINE
10 Claims, 8 Drawing Figs.

[52] U.S. Cl. ..................................... 199/55,
199/13, 192/67
[51] Int. Cl. ....................................... B41b 11/54
[50] Field of Search ........................... 199/11, 18,
20, 55, 56, 59, 13; 192/67, 67A

[56] References Cited
UNITED STATES PATENTS

| | | | |
|---|---|---|---|
| 2,242,178 | 4/1941 | Freund | 199/55 |
| 2,542,599 | 2/1951 | Turner | 199/55X |
| 2,638,792 | 5/1953 | Hilpman | 199/55X |
| 2,717,676 | 9/1955 | Johnson | 192/67X |
| 2,739,685 | 3/1956 | Paulavich | 192/67X |
| 2,774,463 | 12/1956 | Rosetto et al. | 199/11 |
| 2,839,182 | 6/1958 | Tackitt | 199/59 |
| 3,276,553 | 10/1966 | Tilloy | 192/67X |
| 3,285,396 | 11/1966 | Debus | 199/11 |
| 3,291,290 | 12/1966 | Netznik et al. | 199/11X |
| 3,466,429 | 9/1969 | Dunn et al. | 101/93X |

FOREIGN PATENTS

| | | | |
|---|---|---|---|
| 744,943 | 2/1956 | Great Britain | 192/67 |

*Primary Examiner*—Robert E. Pulfrey
*Assistant Examiner*—Eugene H. Eickholt
*Attorney*—Barnard, McGlynn & Reising

ABSTRACT: A mold disc indexing assembly for use with a linecasting machine assembly. The mold disc includes a plurality of molding cavities whereby the mold disc may be indexed to a position where a selected cavity is in an operative position for movement between casting and ejecting positions. The machine includes a main drive shaft and a driven member rotated thereby. A control member is axially shiftable on the main drive shaft between a first position in positive driven engagement through a pin and hole with the driven member and a second position in nondriven engagement with the driven member. The control member includes a control gear in meshing engagement with gear teeth disposed about the circumference of the mold disc. A biasing means urges the control member axially along the main drive shaft toward the first position wherein the pin is disposed in the hole so that the main drive shaft rotates the control member to rotate the mold disc. A forked member is operatively connected to the control member and is moved by a cam follower which is in turn moved by a cam. Upon rotation of the cam, the control member is moved between the first and second positions, the second position being for indexing the mold disc to move another selective mold cavity into position for movement between the molding and ejecting positions. A drive gear is in meshing engagement with the control gear on the control member and the drive gear is rotated by a motor through an electrically actuatable clutch. The end face of the control member has three holes therein and a recess extends circumferentially from each hole. There is a control means for rotating the cam and for engaging or activating the clutch and for sensing indexing movement of the mold disc whereby the cam is rotated to disengage the control member from driving engagement with the main drive shaft, and for activating the clutch so that the drive gear rotates the control member to index the mold disc. The control means also develops a warning signal for rotating the cam before the mold disc reaches the desired position so that the pin engages one of the recesses and slides therealong while being guided thereby to the desired hole. Thus, when the mold disc reaches the desired operative position the drive shaft will enter positive driving engagement with the control member precisely when the mold disc reaches the operative position. This prevents the mold disc from moving past the desired operative position. The control means includes a register for storing the desired position of the mold disc with a plurality of electronic gates being coupled to the register. The output of each of the gates is representative of a particular operative position of the mold disc.

INVENTORS
Gerald A. Fasse &
BY Eugene A. Mychalowych

Barnard, McGlynn & Reising
ATTORNEYS

AUTOMATIC MOLD DISC CONTROL SYSTEM FOR A LINECASTING MACHINE

The instant invention relates to an improved mold disc indexing assembly for use in combination with a linecasting machine assembly. Although the invention will be described and illustrated in an Intertype linecasting machine it will be understood by those skilled in the art that it is also applicable to Linotype linecasting machines.

As is well-known by those skilled in the art, a typical linecasting machine includes a plurality of magazines which are selectively placed in operative positions for supplying matrixes of particular fonts, the fonts being molds generally for particular alphanumeric characters. When a particular magazine is in the operative position, the fonts are supplied to a casting position where the fonts are disposed one beside the other and are placed in position adjacent a mold cavity so that hot metal disposed in the mold cavity is impressed with the fonts to form a slug which defines a line of a column of the type seen in a newspaper. The mold disc has several molding cavities each one being useful for a different size of font. When a certain mold cavity is being utilized, as by being in the operative position, it is rotated between a casting position and an ejecting position where the slug (the piece of metal having letters molded on one face thereof) is ejected through a knife block where it is sized by trimming its opposite sides. Thereafter the slug passes through a saw which cuts the slug to a predetermined length.

In the Intertype machine, the circumference or periphery of the mold disc has a plurality of teeth thereabout and a control gear is in meshing engagement therewith. The machine incorporates a main drive shaft which is normally in driving engagement with the control gear so that during operation of the machine, a given mold cavity is moved back and forth between a casting position and an ejecting position by rotation of the mold disc. If it is desirable to move another and different mold cavity into the operative position for movement back and forth between the casting and ejecting positions, the control member is moved manually and axially by a handle formed integrally therewith to be disengaged from the main drive shaft whereupon the control gear may be rotated by the handle to rotate the mold disc which in turn moves the desired mold cavity into the operative position. For many years this was the only way a mold disc could be indexed to move a different or new mold cavity into the operative position for movement between the casting and ejecting positions. Recently, however, control assemblies have been developed to automatically index the mold disc to move a desired mold cavity to the operative position whereby it may be moved back and forth between the casting and ejecting positions. Such assemblies are illustrated in U.S. Pat. Nos. 3,295,396 and 3,291,291.

The prior art assemblies, however, do have some deficiencies. In order to incorporate the prior art assemblies into a linecasting machine it is necessary to eliminate the manual indexing capability in the machine. In other words, in order to utilize a prior art control assembly for indexing the mold disc, it has been necessary to eliminate the manual indexing capability. Thus, in the event of a malfunction or breakdown in a prior art control assembly, the mold disc cannot be indexed manually. In addition, the prior art control assemblies require that many of the basic cop components in a linecasting machine be modified, altered or removed and replaced with different components in order to establish a compatibility between the linecasting machine and the control assembly. This, of course, requires an extensive installation which, of course, requires more maintenance and is much more expensive.

Additionally, one of the most significant deficiencies of the prior art assemblies is the nonpositive reengagement between the control gear and the main drive shaft in the machine after the mold disc has been indexed to the new desired operative position. In other words, in the prior art assemblies, it frequently occurs that, after the mold disc has been indexed to the desired position, a positive mechanical driving connection between the main drive shaft and the control gear does not occur and the control assembly recycles the mold disc by again indexing it to the desired position. That is to say, the control assemblies of the prior art frequently reindex the mold disc because the first indexing movement fails to establish a positive mechanical driving connection between the main drive shaft of the linecasting machine and the control gear which rotates to index the mold disc.

Accordingly, it is an object and feature of this invention to provide a mold disc indexing assembly of the type used with a linecasting machine assembly for automatically indexing the mold disc to a desired operative position in a manner so that, when the mold disc reaches the desired operative position, it will enter a positive driving engagement mode with a main drive means thereby preventing the mold disc from moving past he desired operative position and causing reindexing.

In correlation with the foregoing object and feature, another object and feature of this invention is to provide a mold disc indexing assembly including disengaging means actuatable for disengaging the mold disc from driven engagement with the main drive means, actuation means actuatable for indexing the mold disc to move a selected molding cavity thereof into the operative position for movement between the casting and ejecting positions, and control means actuating the disengaging means and the actuation means respectively and for sensing the indexing movement of the mold disc to deactivate the disengaging means before the mold disc reaches the operative position so that the mold disc and the main drive means will enter a positive driving engagement mode precisely when the mold disc reaches the operative position thereby preventing the mold disc from moving past the operative position.

Again, in correlation with the foregoing objects and features, it is an object and feature of this invention to provide such a mold disc indexing assembly wherein the control means is adapted to be set by manual switching means and is adapted to be set automatically by signals developed from a decoder.

Another object and feature of this invention is to provide a mold disc indexing assembly in combination with a linecasting machine assembly wherein the manual capabilities are retained for indexing the mold disc.

A further object and feature of this instant invention is to provide a mold disc indexing assembly in combination with a linecasting machine assembly wherein very minor modifications and alterations must be made to the linecasting machine for combining the mold indexing assembly therewith.

Another object and feature of this invention is to provide a control means adapted to be set by manual switching means and adapted to be set automatically by signals developed from a decoder.

In correlation with the foregoing object, it is an object and feature of this invention to provide a control means including a register adapted to be set by manual switching means and by means of signals developed from an encoder.

Other objects and attendant advantages of the present invention will be readily appreciated as the same becomes better understood by reference to the following detailed description when considered in connection with the accompanying drawings wherein:

Constructive details of linecasting machines are well known to those skilled in the art and will not be set forth in detail hereinafter except as necessary. Reference may be had to a manual of the Intertype Corporation copyrighted 1943, and entitled "The Intertype" for a specific description of an Intertype machine with which the instant invention may be utilized. Reference may also be had to the official manual of the Mergenthler Linotype Company, Brooklyn, New York, copyright 1940, and entitled "Linotype Machine Principles" for an understanding and more specific description of a Linotype machine of the type with which the instant invention may be utilized.

Figure 1:
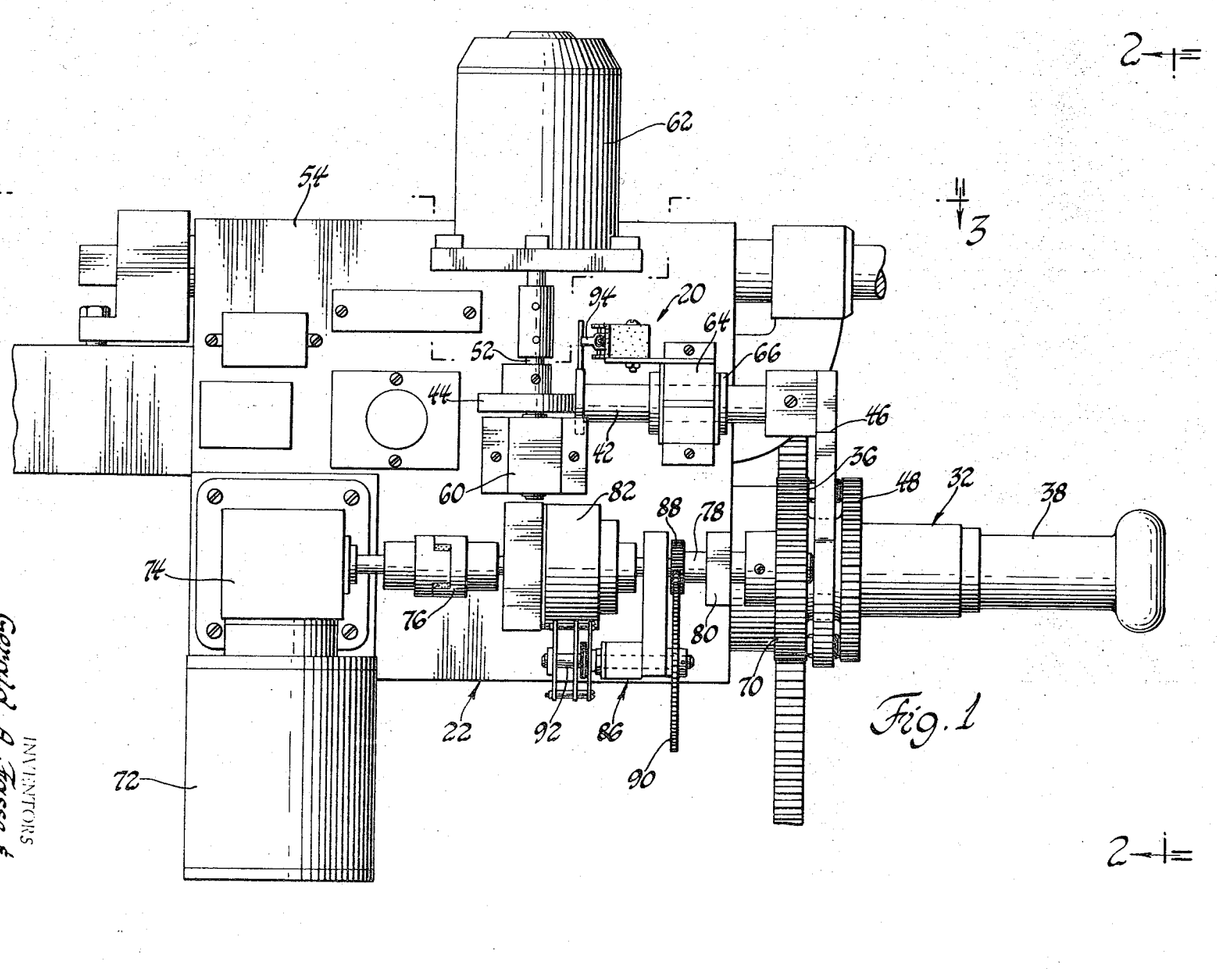
FIG. 1 is a fragmentary elevational view showing a preferred embodiment of a mold-indexing assembly and a portion of a linecasting machine assembly.
Figure 2:
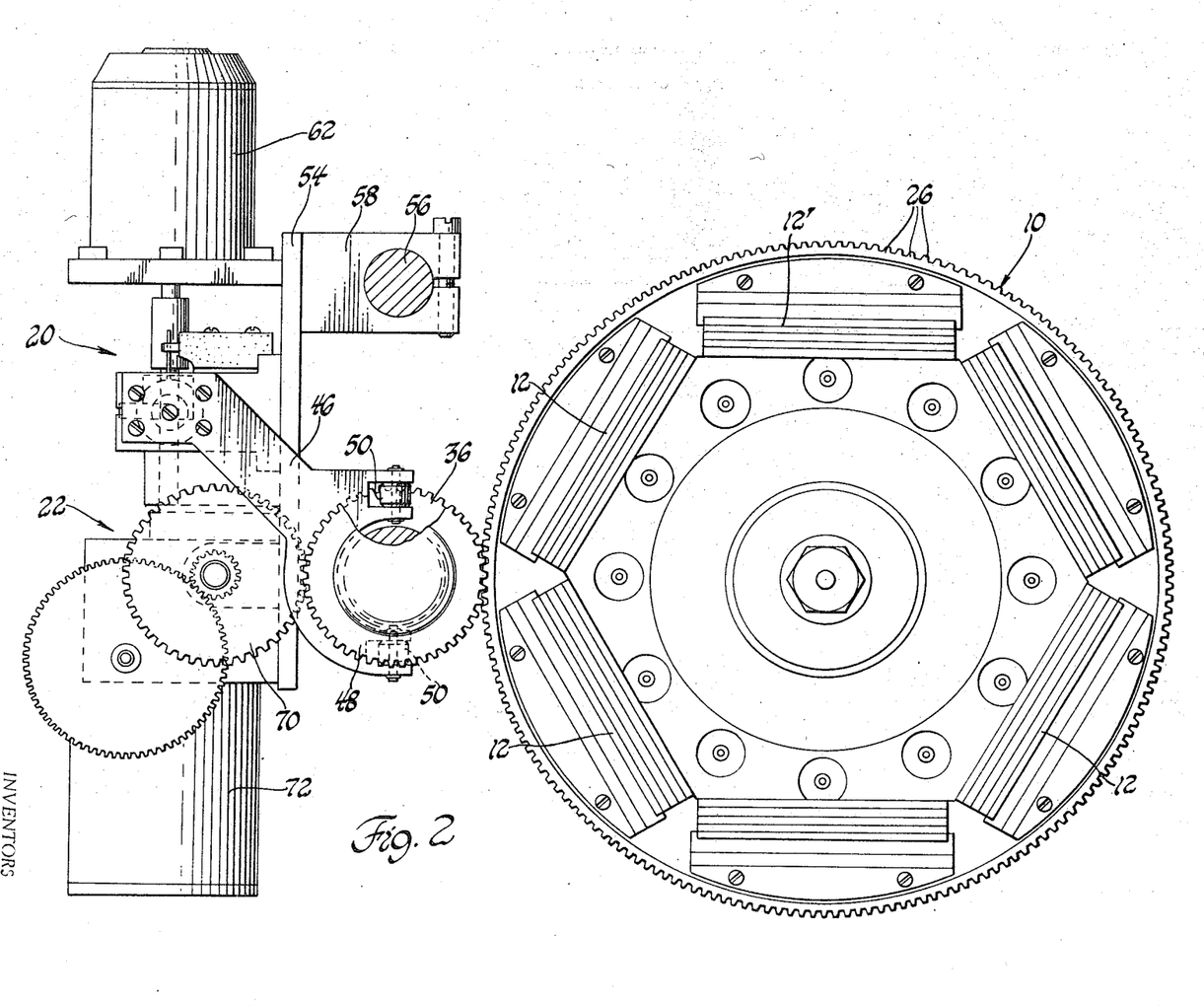
FIG. 2 is a view taken substantially along line 2–2 of FIG. 1.

Referring now to the drawings wherein like numerals indicate like or corresponding parts throughout the several views, there is disclosed a linecasting machine assembly which comprises a mold disc generally indicated at 10 and having a plurality of casting or molding cavities 12. As known to those skilled in the art, the topmost casting cavity 12', as illustrated in FIG. 2, is in the casting position and the ejecting position is 90° therefrom in the clockwise direction. There is also included a main drive means generally indicated at 14 for moving a selected one of the casting cavities 12 back and forth between the casting and ejecting positions.

Figure 3:
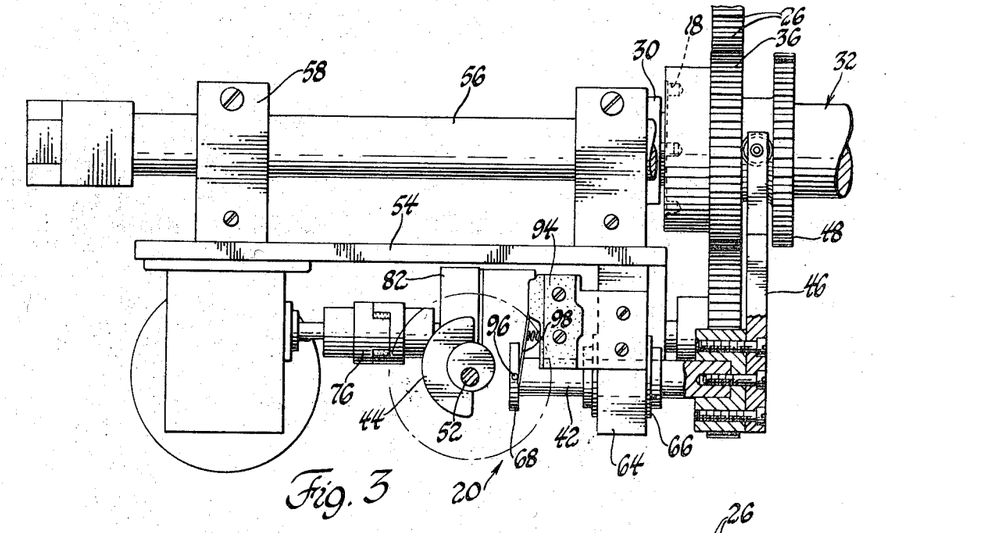
FIG. 3 is a view taken substantially along line 3–3 of FIG. 1.

There is also included coupling means comprising the pin 16 and the holes 18 for normally drivingly interconnecting the main drive means 14 and the mold disc 10 (a position illustrated in FIG. 3). The coupling means is, however, selectively operable to disengage the mold disc from driven engagement with the main drive means (a position illustrated in FIG. 4) so that the mold disc 10 may be indexed to move a selected casting cavity 12 into the operative position for movement between the casting and ejecting positions.

The mold disc indexing assembly includes the disengaging means generally shown at 20 and the actuation means generally shown at 22. The disengaging means 20 is actuatable to control the coupling means for disengaging the mold disc 10 from driven engagement with the main drive means 14. The actuation means 22 is actuatable for indexing the mold disc 10 to move a selected casting cavity into the operative position for movement between casting and ejecting positions.

Figures 6, 7, 8:
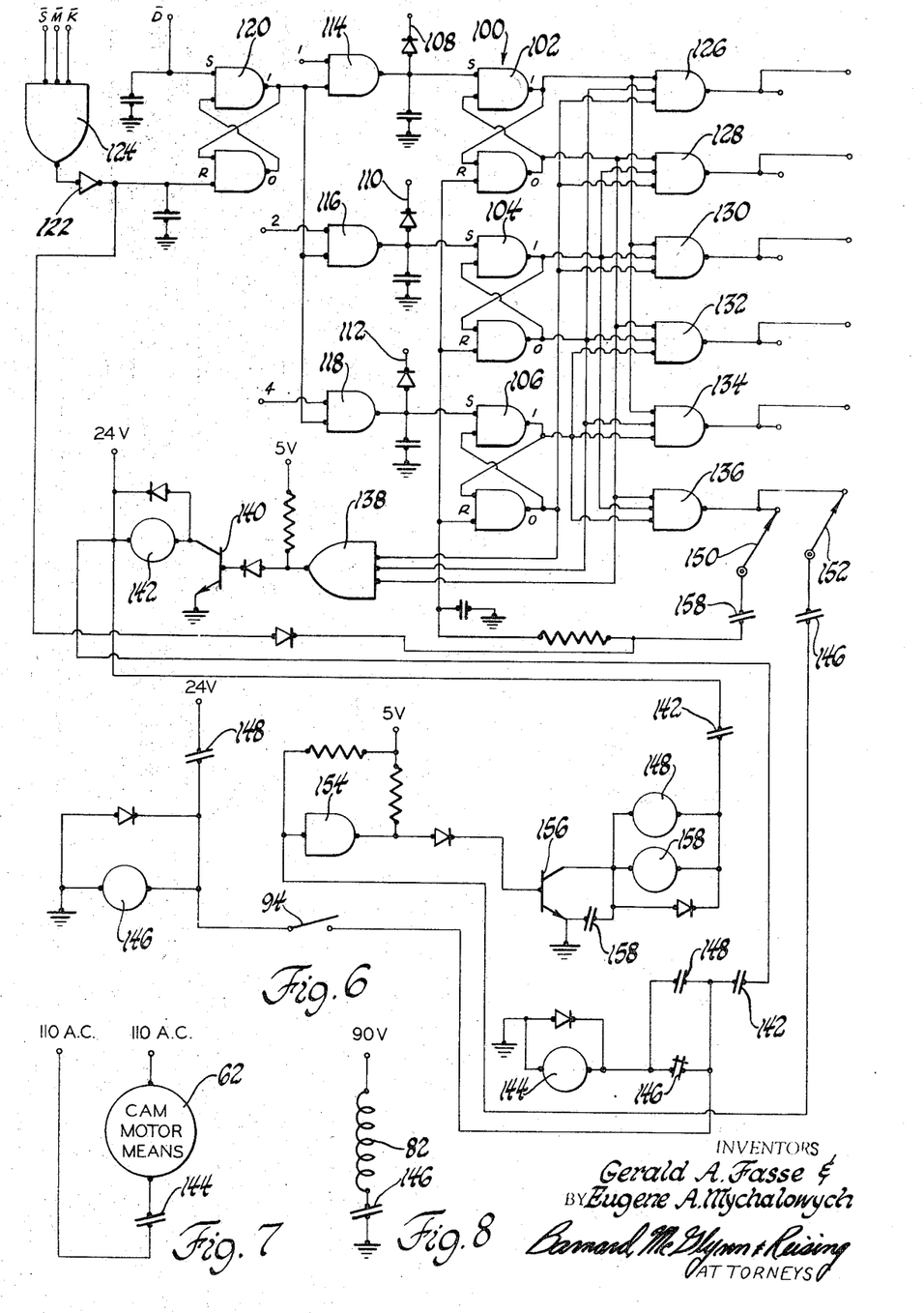
FIG. 6 is a schematic diagram of the control system 24.
FIG. 7 is a schematic diagram of the circuit of motor means 62.
FIG. 8 is a schematic diagram of the circuit of clutch 82.

There is also included control means generally indicated at 24, shown schematically in FIGS. 6 through 8, for actuating the disengaging means 20 and the actuation means 22 respectively and to provide a warning signal for sensing the indexing movement of the mold disc 10 to deactivate the disengaging means 20 before the mold disc 10 reaches the operative position so that the mold disc 10 and the main drive means 14 will enter positive driving engagement precisely when the mold disc 10 reaches the operative position; thus, preventing the mold disc 10 from moving past the operative position. In other words, the pin 16 will positively engage a hole 18 when the desired operative position of the mold disc is reached thereby preventing movement of the pin 16 past the hole 18, which, in turn, eliminates the necessity to recycle or reindex as in the prior art devices.

Figure 4:
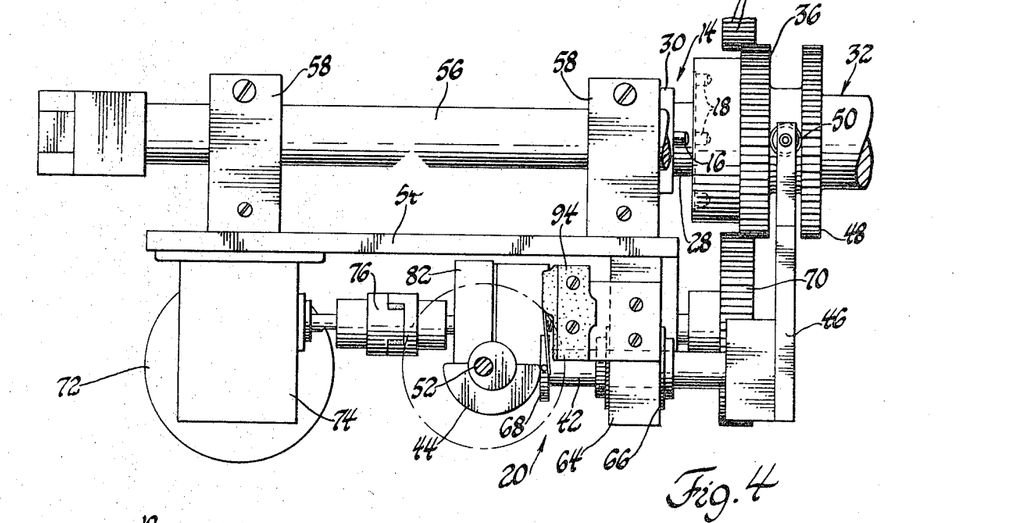
FIG. 4 is a view similar to FIG. 3 but showing the assembly in a different position.

The mold disc 10 has a plurality of gear teeth 26 disposed about the circumference of periphery thereof. The main drive means 14 includes a main drive shaft 28, as illustrated in FIG. 4. The main drive means 14 also includes a driven member 30 which is rotated by the main drive shaft 28.

Figure 5:
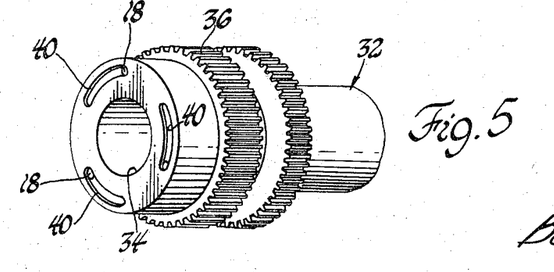
Fig. 5 is a perspective view of the control member of a linecasting machine modified in accordance with the instant invention.

The coupling means besides including the pin 16 and the holes 18 also includes the control member which is generally indicated at 32. As is best illustrated in FIG. 5, the control member 32 has an axial bore 34 therein. The shaft 28 is disposed in bore 34 so that the control member 32 is axially shiftable on the main drive shaft 28. The control member 32 is shiftable between a first position in positive driven engagement with the driven member 30, as illustrated in FIG. 3, and a second position in nondriven engagement with the driven member 30, as illustrated in FIG. 4. The control member 32 includes a control gear 36 which is in meshing engagement with the gear teeth 26 on the mold disc 10 during both the first and second positions which are respectively illustrated in FIGS. 3 and 4. A biasing means comprising a spring or the like (not shown) is disposed within the axial bore 34 of the control member 32 and reacts with the main drive shaft 28 to urge the control member 32 axially relative to the shaft 28 and toward the first position whereat the control member 32 is in driving engagement with the main driven member 30.

The control member 32 also includes a manually graspable handle 38 for manually axially moving the control member 32 from the first position illustrated in FIG. 3 independently of the disengaging means 20. Thereafter, the handle 38 may be rotated for manually rotating the control member 32 while maintained in the second position, which is illustrated in Fig. 4, to manually index the mold disc 10 independently of the actuation means 22.

The holes 18 are disposed in the end face of the control member 32 for receiving the pin 16. Only three holes are necessary because of the relationship between the number of casting cavities in the mold disc 10 and the ratio between the control gear 36 and the gear defined by the teeth 26 about the circumference of the mold disc. Thus, only three holes 18 are necessary to move any one of the six casting cavities into the operative position. Also, there is a recess 40 in the end face of the control member 32 and extending circumferentially in an arcuate path from each hole 18. Each recess is more shallow than the holes 18 so that the pin 16 engages and slides along the desired recess 40 so as to be guided to and into the proper hole 18 when the disengaging means 20 is deactivated and the control member 32 is moved axially from the second position illustrated in FIG. 4 toward the driven member 30 by the biasing means. Hence, the pin moves into the selected hole 18 as the operative position is reached. This, therefore, provides positive driving engagement precisely when the mold disc 10 has been indexed to the desired operative position. Although recesses 40 are much preferred, the system will operate using a conventional control means 32 which as is well-known in the art does not have such recesses.

Referring now more specifically to the disengaging means 20 there is included a cam follower 42 and a cam 44. The cam follower 42 is operatively connected to the control member 32 by a bifurcated form fork member 46. The fork member 46 extends transversely from the cam follower at one end thereof. The control member 32 includes an auxiliary gear 48 which is spaced from the control gear 36 and the fork member 46 has its distal ends disposed between the auxiliary gear 48 and the control gear 36 for axially moving the control member upon movement of the cam follower 42. The auxiliary gear 48 also has a function during maintenance or repair of the machine which is to keep certain components aligned during the maintenance. Rollers 50 are supported at the distal ends of the forked member 46 for rolling engagement with the control gear 36 and the auxiliary gear 48.

The cam 44 is offset from its axis of rotation as best illustrated in FIGS. 3 and 4, its axis of rotation being the axis of the shaft 52. The cam 44 has an initial position out of contact with the cam follower 42, as illustrated in FIg. 3, and an operative position in contact with the cam follower 42, as illustrated in FIG. 4. When the cam 44 is in the operative position, the cam follower 42 is moved to the maximum extend thereby to move the control member 32 to the second or disengaged position as illustrated in FIG. 4.

There is included a support plate 54 which is mounted on a shaft 56 of the machine by the brackets 58. A first bracket means 60 is attached to the support plate 54. The cam shaft 52 is rotatably supported by the bracket 60 and supports the cam 44 and is driven by a cam motor means 62. A second bracket means 64 is attached to the support plate 54 and a bushing 66 is supported in the second bracket means 64. The cam follower 42 is supported within the bushing 66. The cam follower 42 has a head 68 on one end thereof for engaging the cam 44. The cam follower 42 is axially shiftable through the bracket 64 for moving the forked member 46 axially to move the control member 32 between the engaged and disengaged positions.

Turning now more specifically to the actuation means 22, there is includes a drive gear 70 in meshing engagement with the control gear 36 when the control gear 36 is in either of the first and second positions, as illustrated in FIGS. 3 and 4 respectively. The actuation means also includes motor means 72 for rotating the drive gear 70 to index the mold disc 10. In the preferred embodiment, motor means 72 is running continually. A gear box 74 is attached to the support plate 54 and the motor means 72 is operatively connected to and supported by the gear box 74. There is also included a resilient coupling 76 disposed between the gear box 74 and the drive gear 70 for absorbing shock loads. Preferably the resilient coupling 74 has a neoprene, or the like, member therein through which forces are transmitted. It will be appreciated that when the pin 16 falls into one of the holes 18 the gear 70 stops very abruptly and the shock, if any, will be absorbed by the resilient bushing 76. The gear 70 is supported by a shaft 78 which is in turn rotatably supported by a mount 80, the mount 80 being secured to the support plate 54. The actuation means 20 also includes a clutch means 82 which is selectively actuatable for transmitting rotary motion from the gear box to the drive train 70. Preferably the clutch 82 is a magnetic clutch that is electrically actuated as shown in FIG. 8 and hereinafter described.

The control means 24 also includes a sensing means, which is generally indicated at 86, for indicating the angular position of the mold disc 10 during the indexing movement thereof. The sensing means 86 includes a first gear 88 which is driven by the shaft 78 along with the drive gear 70, a second gear 90 which is in meshing engagement with the first gear 88, and an angular position indicator 92 which is driven by the second gear 90.

In the preferred embodiment, angular position indicator 92 is a multiposition circular rotary switch with the operative positions of the switch corresponding to various operative positions of mold disc 10. The switch has a plurality of contacts disposed in a circle with a rotary arm moving from one contact to another and with each contact corresponding to the various operative positions of mold disc 10. The arm, of course, is driven by gear 90. In order to develop the signal indicating that the mold disc 10 is approaching the desired operative position, a second set of contacts and a second arm is employed, all more clearly shown in the schematic of FIG. 6 and hereinafter described for developing the warning signal.

The control means 24 also includes a switch means 94 for providing a signal when the cam 44 is in the operative position, the cam follower 42 having been moved to its maximum extent, to effect deactivation of the motor means 62 and energization of the clutch means 82. Such respectively positions the cam 44 in the operative position, as illustrated in FIG. 4, and rotates the drive gear 70 to index the mold disc 10. In other words, the control means 24 provides a signal to the motor means 62 for rotating the cam 44 from the initial position toward the operative position. A pin 96 extends upwardly from the head of the cam follower to engage a leaf member 98 of the switch 94 so that the switch 94 is activated when the cam follower 42 is moved to the operative position as illustrated in FIG. 4. At this time the control means 24 sends a signal to stop rotation of the motor 62 and also sends a signal to energize the clutch 82 to transmit power to the gear 70. When the cam follower 42 is in the position as illustrated in FIG. 4, the control member 32 is out of driving engagement with the main drive member 30 and therefore subsequent rotation of the drive gear 70 indexes the mold disc toward the desired operative position. During this indexing movement, the angular position indicator 92 determines when the mold disc is approaching the desired operative position and provides a signal which is utilized to activate the motor 62 to rotate the cam 44 to the initial position illustrated in FIG. 3 so that the pin 16 engages one of the recesses 40 and slides therealong and is guided thereby to fall into one of the holes 18 when the mold disc reaches the desired operative position. This, therefore, provides a positive driving engagement and prevents the mold disc from moving past the desired operative position. After the pin has dropped into the desired hole 18, the control member 32 is rotated by the drive shaft 28 to move the desired casting mold 12 between the casting and ejecting positions during the normal operation of the machine.

Turning now to the control means 24, and with particular reference to FIGS. 6 through 8, it should first be noted that the control means 24 is designed to operate in conjunction with the auxiliary function control means disclosed in copending application P-301, Ser. No. 717,328, filed Mar. 29, 1968, entitled "Automatic Saw Control Assembly for a Linecasting Machine" filed simultaneously with this application and which is assigned to the assignee of this application.

However, it should be understood that any means for electronically or otherwise developing a plurality of signals representative of operative positions of mold disc 10 may be employed with the invention herein disclosed.

The system of the aforesaid P-301 application utilizes a means for applying numbers in the standard teletype code along with coded letters representing auxiliary linecasting machine functions such as the knife block K, the saw S, and the mold disc D to a decoder. The output of this decoder represents digits in 8 - 4 - 2 - 1 BCD code and also has outputs for each auxiliary command function such as K, S, and D. Such outputs are used by control means 24 hereinafter described.

With reference to FIGS. 6 through 8 there is shown therein a control means for controlling either automatically or semiautomatically the movement of disc 10. The new desired operative position for mold disc 10 is received either from the decoder of the aforesaid application or is placed in the system directly by a set of manual switches in a control box (not shown). The desired position is stored in a register 100 consisting of three flip-flops 102, 104 and 106. Each flip-flop is preferably formed by a pair of NAND gates arranged in the well-known manner. Register 100 is designed to store a decimal digit in the well-known 8 - 4 - 2 - 1 BCD code with flip-flop 102 storing the ones digit, flip-flop 104 storing the twos digit, and flip-flop 106 storing the fours digit. The set line for flip-flop 102 is connected by means of line 108 to a semiautomatic control means (not shown). Lines 110 and 112 are similarly connected with respect to flip-flops 104 and 106 respectively. Lines 108, 110 and 112 enable the register 100 to be set semi-automatically by manual switching means preferably by electronic decade switches (not shown). The set line of flip-flops 102, 104 and 106 are also connected to the outputs of NAND gates 114, 116 and 118 respectively. One input to gates 114, 116 and 118 respectively are the 1, 2 and 4 information lines respectively of the decoder of the aforesaid application. A common input to gates 114, 116 and 118 is the output from control flip-flop 120. Flip-flop 120 has its set line connected to the inverted mold control signal D line, shown in FIG. 6 as line $\bar{D}$ from the decoder of the aforesaid application and consequently is generally maintained in its reset state with its reset line connected through inverter 122 to NAND gate 124 whose inputs are the other auxiliary function lines inverted. Only when flip-flop 120 is in the set state will gates 114, 116 and 118 let information from lines 1, 2 and 4 from the decoder pass to register 100.

The outputs from flip-flops 102, 104 and 106 are connected to a 8 - 4 - 2 - 1 BCD decoder formed by coupling NAND gates 126, 128, 130, 132, 134 and 136 in the following manner to the outputs of flip-flops 102, 104 and 106. Gate 126 has as its inputs the 1 output of flip-flop 102 and the 0 output of both flip-flops 104 and 106. Gate 128 has as its inputs the 0 outputs of flip-flops 102 and 106, and the 1 output of flip-flop 104. Gate 130 has as its inputs the 1 outputs of flip-flops 102 and 104 and the 0 output of 106. Gate 132 has as its inputs the 0 outputs of flip-flops 102 and 104 and the 1 output of 106. Gate 134 has as its inputs the 1 outputs of flip-flops 102 and 106 and the 0 output of 104. Gate 136 has as its inputs the 1 outputs of flip-flops 104 and 106 and the 0 output of 102. Hence, gates 126, 128, 130, 132, 134 and 136 have as their outputs the lines representing desired operative positions 1, 2, 3, 4, 5 and 6 respectively of mold disc 10.

In order to activate the system in response to a desired position being placed in register 100, NAND gate 138 is utilized having as inputs the 0 outputs of flip-flops 102, 104 and 106. The output of gate 138 is applied to the base of NPN transistor 140 whose emitter is grounded and whose collector is coupled through the energizing circuit of relay 142 to a 24 v. source. The base of transistor 140 is also coupled to a 5 v. source in order to improve the driving capability of gate 138 when transistor 140 is turned on. When register 100 is clear, the output of gate 138 is grounded biasing transistor 140 off so that the energizing circuit of relay 142 is not energized. However, when a desired position is stored in register 100, transistor 140 is on, and thus energizing circuit of relay 142 is energized closing relay 142.

The energizing circuit for the relay 144 is coupled through normally closed relay 146 and normally open relay 142 from ground to a 24 v. source and also through normally open relay 148 and relay 142 to a 24 v. source. Relay 144 as shown in FIG. 7 is normally open and is connected between ground and motor means 62. Motor means 62 is turned on when relay 144 is closed which in turn is closed when relays 142 and 146 are closed. Thus, it is apparent that, as soon as a desired position is stored in register 100, motor means 62 is turned on turning cam 44.

A second path is provided from the 24 v. source through normally open relay 142, switch 94 and relay energizing circuit 146 to ground. When switch 94 is closed, the energizing coil of relay 146 is energized closing relay 146 as shown in FIG. 8 and the magnetic clutch 82 is energized by a 90 v. source causing the rotation of control member 32. In addition, normally closed relay 146 is opened turning off motor means 62. Thus, cam 44 is placed in its second position and mold disc 10 commences to move toward the desired position.

The warning signal means for turning on motor means 62 to return cam 44 to its first position while clutch 82 remains energized when mold disc 10 approaches its desired position is hereinafter described. The output of each of gates 126, 128, 130, 132, 134 and 136 is coupled to each of first and second sets of contacts of rotary switch 92 so that each output of said gates can cooperate with the first and second arms of the stepping switch 92 shown schematically at 150 and 152 of FIG. 6. Arm 152 is coupled through relay 146 to inverter 154 to the base of NPN transistor 156 whose base is coupled to a 5 v. source and whose emitter is grounded. Inverter 154 also has its input coupled to a 5 v. source. In the absence of a ground potential being applied to arm 152, transistor 156 is nonconducting. The collector of transistor 156 is coupled to two parallel relay energizing circuits 148 and 158 which in turn are coupled through normally open relay 142 to a 24 v. source. The collector is also connected to ground through normally open relay 158 which when closed remains latched until relay 142 is opened. When a ground potential is applied to arm 152 through one of the outputs of gates 126, 128, 130, 132, 134 and 136 to develop the warning signal relays 148 and 158 are closed, relay 142 having already been closed, thus energizing relay 144 turning on motor means 62 which results in movement of follower 42 opening switch 94. The cam 44 thus returns to its first position. However, magnetic clutch 82 remains energized because of the alternate path for energizing circuit 146 from ground through relay 148 to a 24 v. source. Thus, motor means 62 is deenergized while clutch 82 remains energized and the disc 10 continues to turn.

Since relay 158 remains latched until relay 142 is opened, the fact that arm 152 does not remain grounded as it leaves the grounded contact as disc 10 continues toward its desired position does not affect the functioning of the circuit since the energizing coils of relays 158 and 148 remain energized until the control means 24 is deactivated by deenergizing coil 142.

The deactivating signal for stopping the rotation of mold disc 10 is applied through arm 150 which is connected through relay 158 to the reset inputs of flip-flops 102, 104, 106 and 120. As soon as a ground potential is applied to arm 150 in response to one of the NAND gate outputs being at ground, flip-flops 102, 104 and 106 are reset turning off transistor 140 and thus opening relay 142. With this relay open the clutch 82 is deenergized. If flip-flop 120 has not already been reset by gate 124, it will be reset by pointer 150 so that no information can pass through decoder lines 1, 2 and 4 to register 100 until the mold disc 10 is to be reset at a new desired position.

We claim:

1. A mold disc indexing assembly for use with a typographical linecasting machine assembly of the type including a mold disc having a plurality of casting cavities and main drive means for moving a selected one of the cavities back and forth between casting and ejecting positions and coupling means normally drivingly interconnecting the main drive means and the mold disc and selectively operable to disengage the mold disc from driven engagement with the main drive means whereby the mold disc may be indexed to move another cavity into the operative position for movement between the casting and ejecting positions said indexing assembly comprising; disengaging means actuatable to control the coupling means for disengaging the mold disc from driven engagement with the main drive means, actuation means actuatable for indexing the mold disc to move a selected molding cavity into the operative position for movement between the casting and ejecting positions, means for actuating said disengaging means and said actuation means respectively, a register for storing the desired operative position of the mold disc, a plurality of electronic gates coupled to said register, the output of each of said gates being representative of a particular operative position of the mold disc, and means cooperating with the outputs of said gates for providing warning and deactivating signals indicating that said disc is close to the desired operative position being coupled to said disengaging means for deactivating said disengaging means, said deactivating signal indicating that said disc has reached the desired position being coupled to said actuating means for deactivating said actuating means.

2. An assembly as set forth in claim 1 wherein said actuation means includes a first motor means and a drive gear driven thereby so that said drive gear is utilized to index the mold disc wherein said disengagement means includes a second motor means and connection means adapted to control movement of the coupling means and for allowing independent movement of the coupling means.

3. An assembly as set forth in claim 2 wherein said disengaging means includes a cam follower adapted to be operatively connected to the coupling means and a cam rotated by said second motor means between an initial position out of contact with said cam follower and operative position in contact with said cam follower whereby the cam follower is moved to its maximum extent, said cam being offset from its axis of rotation.

4. An assembly as set forth in claim 3 wherein said means for activating said disengaging means includes sensing means for determining the angular position of the mold disc during indexing movement thereof for sending a signal to said second motor means to rotate said cam to said initial position before the mold disc reaches the desired operative position.

5. An assembly as set forth in claim 4 wherein said actuation means including clutch means selectively operable to transmit drive from said first motor means to said drive gear, and switch means for providing a signal to said deactivation means when said cam is in said operative position and said cam follower has been moved its maximum extent to effect deactivation of said second motor means and operation of said clutch means for respectively positioning said cam in said initial position and rotating drive gear.

6. An assembly as set forth in claim 5 wherein said actuation means includes a resilient coupling disposed between said first motor means and said drive gear for absorbing shock loads.

7. An assembly as set forth in claim 6 wherein said sensing means includes a first gear driven with said drive gear, a second gear in meshing engagement with said first gear, and an angular position indicator driven by said second gear.

8. An assembly as set forth in claim 7 including a support plate, said second motor means being attached to said support plate, a gear box attached to said support plate, said first motor means being operatively connected to and supported by said gear box, said resilient coupling being disposed between said gear box and said clutch means, a shaft extending from said clutch means to said drive gear, a mount attached to said support plate and rotatably supporting said shaft, first bracket means attached to said support plate, a cam shaft driven by said second motor means and supporting said cam and rotatably supported by said first bracket means, a second bracket means attached to said support plate, a bushing supported in said second bracket means, said cam follower being supported within said bushing, said cam follower having a head on a first end thereof for engaging said cam and a forked member extending transversely therefrom at the second end thereof.

9. An assembly as set forth in claim 1 wherein said means cooperating with the outputs of said gates for providing warning and deactivating signals includes a multiposition circular rotary switch having a first set of contacts, each of said gates having its respective output coupled to a different one of said contacts, a second set of contacts, each of said gates having its respective output coupled to a different one of said second set of contacts, first and second arms, said first arm being adapted for sequentially engaging said first set of contacts and said second arm being adapted for sequentially engaging said second set of contacts, said arms being mechanically coupled to said mold disc, and said arms being so arranged that said second arm contacts each of said outputs of said gates shortly before said first arm contacts the output of said gate for providing a warning signal prior to providing a deactivating signal.

10. An assembly as set forth in claim 1 wherein said actuation means includes a generally constantly running motor means having a magnetic clutch operatively coupling said motor to said mold disc.

UNITED STATES PATENT OFFICE
CERTIFICATE OF CORRECTION

Patent No. 3,552,547　　　　　　　　　　Dated January 5, 1971

Inventor(s) Gerald A. Fasse et al.

It is certified that error appears in the above-identified patent and that said Letters Patent are hereby corrected as shown below:

Column 1, line 52, "3,295,396" should read -- 3,285,396 line 63, cancel "cop". Column 2, line 17, "he" should read -- the --. Column 3, line 20, after "ninety" insert -- (90) --. Column 4, line 21, after "six" insert -- (6) --. Column 6, line 7, cancel "filed March 29, 1968", Signed and sealed this 17th day of August 1971.

(SEAL)
Attest:

EDWARD M. FLETCHER, JR.　　　　　　　WILLIAM E. SCHUYLER, JI
Attesting Officer　　　　　　　　　　　Commissioner of Patents